(12) United States Patent
Dersy

(10) Patent No.: US 9,986,041 B2
(45) Date of Patent: *May 29, 2018

(54) COMMUNICATIONS MANAGEMENT SYSTEM WITH A SEPARATE PERIPHERALS SERVER

(71) Applicant: Amadeus S.A.S., Biot (FR)

(72) Inventor: Julien B Dersy, Guildford (GB)

(73) Assignee: Amadeus S.A.S., Biot (FR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/472,904

(22) Filed: Mar. 29, 2017

(65) Prior Publication Data
US 2017/0208131 A1    Jul. 20, 2017

Related U.S. Application Data

(63) Continuation of application No. 14/804,959, filed on Jul. 21, 2015.

(51) Int. Cl.
*G06F 15/16* (2006.01)
*H04L 29/08* (2006.01)
(Continued)

(52) U.S. Cl.
CPC ........ *H04L 67/141* (2013.01); *H04L 12/4641* (2013.01); *H04L 49/30* (2013.01);
(Continued)

(58) Field of Classification Search
USPC .......................... 709/227, 223, 228, 205, 218
See application file for complete search history.

(56) References Cited

U.S. PATENT DOCUMENTS 6,026,238 A    2/2000  Bond et al.
6,842,766 B2   1/2005  Brockway et al.
(Continued)

FOREIGN PATENT DOCUMENTS

EP    2763037 A1    8/2014
EP    3121773 A1    1/2017
(Continued)

OTHER PUBLICATIONS

European Examination Report dated Jul. 10, 2017 in EP 15290192.2 (3 pages).
(Continued)

*Primary Examiner* — Lan-Dai T Truong
(74) *Attorney, Agent, or Firm* — Finnegan, Henderson, Farabow, Garrett & Dunner LLP

(57) ABSTRACT

Systems and methods for managing an airport passenger processing system. The system includes a computing device and a peripheral device at an airport, a peripherals interface in communicative connection with the peripheral device and operable to execute a second client application, and a network outside the airport. The network includes a virtualization server for virtualizing an application for a first client application executed by the computing device and a peripherals manager in communication with the virtualization server. The first client application is configured to establish a first communication channel with the virtualization server for communication with an application virtualized on the virtualization server. The second client application is configured to establish a second communication channel with the peripherals manager. At least part of the network is configured to store an association between the first and second communication channels to associate the peripheral device with the computing device.

23 Claims, 7 Drawing Sheets

(51) Int. Cl.
*H04L 12/935* (2013.01)
*H04L 12/46* (2006.01)
*H04L 29/06* (2006.01)
*H04L 29/12* (2006.01)

(52) U.S. Cl.
CPC .......... *H04L 61/2007* (2013.01); *H04L 67/18* (2013.01); *H04L 67/42* (2013.01)

(56) References Cited

U.S. PATENT DOCUMENTS

| | | | |
|---|---|---|---|
| 6,898,653 | B2 | 5/2005 | Su et al. |
| 7,286,974 | B2 | 10/2007 | Siahaan et al. |
| 7,688,461 | B2 | 3/2010 | Wise |
| 7,870,153 | B2 | 1/2011 | Croft et al. |
| 7,966,622 | B1 | 2/2011 | Purser et al. |
| 8,032,353 | B1 | 10/2011 | Baron et al. |
| 8,069,226 | B2 | 11/2011 | Momchilov et al. |
| 8,166,105 | B2 | 4/2012 | Tono |
| 8,171,103 | B2 | 5/2012 | Robinson et al. |
| 8,234,333 | B2 | 7/2012 | Morard |
| 8,355,407 | B2 | 1/2013 | Wookey et al. |
| 8,479,195 | B2 | 7/2013 | Adams et al. |
| 8,621,123 | B2 | 12/2013 | Caballero |
| 8,732,287 | B2 | 5/2014 | Lee et al. |
| 8,881,140 | B1 | 11/2014 | Bringhurst |
| 8,886,822 | B2 | 11/2014 | Pendersen et al. |
| 8,893,123 | B2 | 11/2014 | Miyamoto et al. |
| 8,937,930 | B2 | 1/2015 | Sprigg et al. |
| 8,949,316 | B2 | 2/2015 | Lauwers et al. |
| 8,978,031 | B2 | 3/2015 | Kamble et al. |
| 9,141,325 | B2 | 9/2015 | Dersy et al. |
| 9,210,100 | B2 | 12/2015 | Van Der Linden et al. |
| 9,294,544 | B1 | 3/2016 | Fausak et al. |
| 2006/0015316 | A1 | 1/2006 | Siahaan et al. |
| 2006/0041651 | A1 | 2/2006 | Walcutt et al. |
| 2007/0244966 | A1 | 10/2007 | Stoyanov et al. |
| 2008/0288940 | A1 | 11/2008 | Adams et al. |
| 2009/0043921 | A1 | 2/2009 | Roy |
| 2009/0164990 | A1 | 6/2009 | Ben-Yehuda et al. |
| 2009/0248458 | A1 | 10/2009 | Ouellette et al. |
| 2010/0058341 | A1 | 3/2010 | Jung et al. |
| 2010/0180050 | A1 | 7/2010 | Hsiao et al. |
| 2011/0035758 | A1 | 2/2011 | Stoyanov et al. |
| 2011/0087726 | A1 | 4/2011 | Shim et al. |
| 2011/0106929 | A1 | 5/2011 | Lee et al. |
| 2011/0205965 | A1 | 8/2011 | Sprigg et al. |
| 2012/0011499 | A1 | 1/2012 | Conover et al. |
| 2012/0054740 | A1 | 3/2012 | Chakraborty et al. |
| 2012/0124580 | A1 | 5/2012 | Bouchier et al. |
| 2012/0158822 | A1 | 6/2012 | Dai et al. |
| 2012/0167044 | A1 | 6/2012 | Fortier et al. |
| 2012/0206751 | A1 | 8/2012 | Bradshaw et al. |
| 2012/0297379 | A1 | 11/2012 | Anderson et al. |
| 2013/0166629 | A1 | 6/2013 | Ivashin et al. |
| 2014/0130041 | A1 | 5/2014 | Luxenberg et al. |
| 2014/0223043 | A1 | 8/2014 | Dersy et al. |
| 2015/0334184 | A1 | 11/2015 | Liverance |
| 2016/0216987 | A1 | 7/2016 | Burrell et al. |

FOREIGN PATENT DOCUMENTS

| | | |
|---|---|---|
| JP | 4775154 B2 | 9/2011 |
| WO | WO-2011/022375 A1 | 2/2011 |
| WO | WO-2014/118349 A1 | 8/2014 |

OTHER PUBLICATIONS

Extended European Search Report dated Sep. 23, 2015 in EP 15290192.2 (6 pages).

Hirofuchi et al., "A Peripheral Bus Extension for Device Sharing Over IP Network" Freenix Track: 2005 USENIX Annual Technical Conference, pp. 47-60 (2005).

Reactos, USB/IP Project "USB Request Over IP Network" published Feb. 21, 2011, downloaded at usbip.sourceforge.net on Oct. 17, 2017 (4 pages).

European Patent Office, Search Report and Written Opinion issued in corresponding Application No. 15290192.2, dated Sep. 3, 2015, 6 pages.

COMMUNICATIONS MANAGEMENT SYSTEM WITH A SEPARATE PERIPHERALS SERVER

TECHNICAL FIELD

Embodiments relate to communications management and, more particularly, to the management of communication between peripheral devices within a virtualized communications system for airports.

BACKGROUND

Airport communication systems comprise a large number of terminals which are shared between a variety of airlines, each having their own departure control system (DCS). A departure control system is a server containing details relating to the departures for the airline (passenger records, flight details etc.). As the terminals are shared between airlines (for instance, at departure gates or check-in desks), each terminal must be able to communicate effectively with a variety of departure control systems. To this end, virtualization has been implemented such that the terminals themselves are clients of a virtualization server which runs virtual applications for the clients. This allows users working for different airlines to share the same terminal and, using the terminal as a basis, interact effectively with their airline's DCS (checking passengers in, accessing flight information, etc.).

The nature of airports is such that there are a large number of peripheral devices, many of which are not in common use outside of the airport environment (for example, baggage tag printers or boarding pass bar code scanners). These peripherals need to communicate with the terminals as well as the external servers to enable their operation based on up to date information as provided by the relevant departure control system.

Each terminal has a peripheral manager which contains drivers for peripherals connected to it and which establishes communication between the terminal and the peripherals. These peripheral managers are limited in their ability to communicate with server based (virtual) applications due to the use of non-static IP addresses and the need for IP address translation when communicating across networks comprising a mix of public and private addressing schemes.

One means of implementing communication between peripheral devices and various departure control systems is to direct communication based on fixed IP addresses and hostnames. This solution is problematic given the limited availability of public IP addresses and also present issues relating to security, firewalls and mobile data modes where 3G and/or 4G networks are used. Further problems arise from the need for many routing configurations that must be established and effectively managed, and the need to manage multiple stakeholders providing different elements of the communications, for example, airport authorities, network providers, airport information providers etc.

In addition, firewalls often block communication channels which are established by external devices, unless specific rules allowing communication from said devices have been established. This means that communication from an external virtualization server to peripherals within a local area network may well be blocked. To set up rules for each and every peripheral would be a complex and time consuming process for large networks, such as those implemented in airports.

Many virtualization protocols, however, do not allow external applications to establish and use virtual channels within the communication link between the virtualization server and the client.

Accordingly, there is a need for a flexible means of establishing communication between an application virtualized on an external server and a peripheral locally connected to a client.

SUMMARY

According to a first aspect of the invention there is provided a system for managing an airport passenger processing system. The system comprising a computing device at an airport operable to execute a first client application, a peripheral device at the airport, a peripherals interface in communicative connection with the peripheral device and operable to execute a second client application. The system further comprises a network outside the airport comprising a virtualization server for virtualizing an application for the first client application, and a peripherals manager in communicative connection with the virtualization server. The first client application is configured to initialize establishing a first communication channel with the virtualization server for communication with an application virtualized on the virtualization server. The second client application is configured to initialize establishing a second communication channel with the peripherals manager. At least part of the network outside the airport is configured to store an association between the first communication channel and the second communication channel to associate the peripheral device with the computing device.

By storing an association between the two communication channels, the system allows communication between the virtualized application and the peripheral device. Utilizing two communication channels, one for virtualization and one for peripherals management, provides a more flexible system which may be implemented in a variety of virtualization schemes. As each communication channel is initiated inside the airport, the peripherals manager and virtualization server can effectively communicate with the peripherals interface and computing device respectively over a mix of addressing schemes and without communications being blocked by an airport firewall.

The association may be stored by means of a map or table relating the first communication channel to the second communication channel. The network outside of the airport may be a single network, or may comprise a number of connected networks, for instance, a number of networks connected via the internet.

The peripherals manager may be configured to receive messages from the application virtualized on the virtualization server and send them, according to the association, to the peripheral device and/or receive messages from the peripheral device and send them, according to the association, to the application virtualized on the virtualization server. This facilitates communications between the peripheral device and the virtualized application.

According to one embodiment, the peripherals server is configured to establish the association by matching a first identifier identifying the first client device and a second identifier identifying the second client device, the first identifier having been received by the peripherals server from the virtualization server. The first identifier may have been generated by the virtualization server. This generation may be based on information provided by the computing device. Alternatively, the first identifier may be provided by the computing device and via the virtualization server. The second identifier may have been received from the second client application. Alternatively, the second identifier may have been generated by the peripherals manager. The generation may have been based on information provided by the peripherals interface.

According to one embodiment, the first and second identifiers are matched if they are the same. Alternatively, the peripherals manager may be configured to match the first and second identifiers if the first and second identifiers are within a predefined threshold of each other, or according to a selection received from the virtualized application.

By matching based on a predefined threshold, similar identifiers may be matched even if there is no exact match. For instance, this may be the case where the identifiers are positions and the predefined threshold is a predefined distance between the computing device and the peripherals interface. Alternatively, the identifiers may be the name of the computing device and peripheral device, and the threshold may be a numerical difference between one or more corresponding characters in the names. For instance, where the computing device is named "workstation1" and the peripherals interface is named "workstation3", the identifiers may be matched if the threshold is 2 in relation to the final character in the names.

By matching based on a selection received from the virtualized application, the user or application may define the match, and therefore select a specific peripherals interface to use. This selection may originate from the virtualized application, or may be input by a user via the computer terminal.

The first identifier may comprise one or more of the name of the computing device, the IP address of the computing device, the location of the computing device, the airport and terminal at which the computing device is located, and a key generated by the first application and/or the application virtualized on the virtualization server when the application virtualized on the virtualization server is executed. The second identifier may comprise one or more of the name of the peripherals interface, the IP address of the peripherals interface, the location of the peripherals interface, the airport and terminal at which the peripherals interface is located, and a key generated by the second application and/or the peripherals manager when communication between the peripherals manager and the second application is established.

Accordingly, where the first and second identifiers represent the locations of the computing device and peripherals interface respectively, the peripheral manager may match the first and second identifiers if the computing device and peripherals interface are within a predefined threshold distance of each other. This allows a user to be assigned a nearby peripheral device.

In one embodiment, the computing device comprises the peripherals interface and the name of the peripherals interface is the name of the computing device. This means that the first and second identifiers may be the name of the computing device, providing the same identifier for the computing device and the peripherals interface to ensure that a match may be made by the peripherals manager. The airport may be operated such that each computing device has its own unique name, to avoid clashes in the system. Alternatively, the peripherals interface may be assigned a different name to the computing device.

The virtualization server may comprise the peripherals manager. That is, the peripherals manager may be run on the virtualization server to share resources. Alternatively, the peripherals manager may be implemented on a server separate to the virtualization server. The two servers may be located at the same location, or may be located in different locations. The two servers may be connected via the internet or via a local area network.

The computing device may comprise the peripherals interface. That is, the first client application and the second client application may be run on the same computing device. Alternatively, the peripherals interface may be implemented on a further computing device, separate to the computing device. This allows computing devices within the airport to share access to peripheral devices.

According to a further aspect of the invention there is provided a system for virtualizing an application of an airport passenger control system, the system being located in a network outside of the airport and comprising a virtualization server and a peripherals manager. The virtualization server is configured to receive a request from a first client application executed at the airport to establish a first communication channel for communicative connection between a virtualized application executed by the virtualization server and the first client application and, in response, establish the first communication channel. The peripherals manager is configured to receive a request from a second client application executed at the airport to establish a second communication channel for communicative connection between the peripherals manager and the second client application and, in response, establish the second communication channel. The system is configured to store an association between the first and second communications channels to associate a peripheral device in communicative connection with the second client application with the first client application.

The peripherals manager may be configured to receive messages from the application virtualized on the virtualization server and send them, according to the association, to the peripheral device, and/or receive messages from the peripheral device and send them, according to the association, to the application virtualized on the virtualization server.

In one embodiment, the peripherals server is configured to establish the association by matching a first identifier received from the virtualization server with a second identifier received from the peripherals interface, the first identifier identifying the first client device and the second identifier identifying the peripherals interface.

The first and second identifiers may be matched if they are the same or identical. Alternatively, the peripherals manager may be configured to match the first and second identifiers if the first and second identifiers are within a predefined threshold of each other, or according to a selection received from the virtualized application.

The first identifier may comprise one or more of the name of the computing device, the IP address of the computing device, the location of the computing device, the airport and terminal at which the computing device is located, and a key generated by the first client application and/or the application virtualized on the virtualization server when the application virtualized on the virtualization server is executed. The second identifier may comprise one or more of the name of the peripherals interface, the IP address of the peripherals interface, the location of the peripherals interface, the airport and terminal at which the peripherals interface is located, and a key generated by the peripherals interface and/or the peripherals manager when communication between the peripherals manager and the second application is established.

In one embodiment, the computing device comprises the peripherals interface and the name of the peripherals interface is the name of the computing device. The virtualization server may comprise the peripherals manager or the peripherals manager may be implemented on a server separate to the virtualization server.

According to an aspect of the invention there is provided a system at an airport, the system comprising a computing device and a peripherals interface in communicative connection with a peripheral device. The computing device is configured to, upon initialization of a first client application on the computing device, send a request for the establishment of a first communication channel to a virtualization server located in a network outside the airport, to allow communication with a virtualization application being executed on the virtualization server. The peripherals interface is configured to send a request for the establishment of a second communication channel to a peripherals manager located in the network outside the airport. The system is further configured so that the computing device sends a first identifier to the virtualization server and the peripherals interface sends a second identifier to the peripherals server to facilitate the association of the first and second communication channels.

By sending first and second identifiers, the system ensures that the first and second communication channels may be identified and associated with each other. This allows the virtualized application to communicate with the peripheral device via the peripherals interface.

The peripherals interface may be configured to send data received from peripherals manager to the peripheral device and/or send data received from the peripheral device to the peripherals manager. This facilitates communication between the virtualized application and the peripheral device.

The first identifier may comprise one or more of the name of the computing device, the IP address of the computing device, the location of the computing device, the airport and terminal at which the computing device is located, and a key generated by the first client application and/or the application virtualized on the virtualization server when the application virtualized on the virtualization server is executed. The second identifier may comprise one or more of the name of the peripherals interface, the IP address of the peripherals interface, the location of the peripherals interface, the airport and terminal at which the peripherals interface is located, and a key generated by the peripherals interface and/or the peripherals manager when communication between the peripherals manager and the second application is established.

According to a further embodiment of the invention there is provided a method of managing an airport passenger control system, the airport passenger control system comprising a computing device at an airport, a peripheral device at the airport, a peripherals interface in communicative connection with the peripheral device and a network outside the airport. The network outside the airport comprises a virtualization server for virtualizing an application for the first client application and a peripherals manager in communicative connection with the virtualization server. The method comprises initiating a first client application on said computing device, initiating a second client application on the peripherals interface, initialising by the first client application the establishment of a first communication channel with the virtualization server to allow communication with the application virtualized on the virtualization server, initialising by the second client device the establishment of a second communication channel with the peripherals manager, and storing, in at least part of the network outside the airport, an association between the first communication channel and the second communication channel to associate the peripheral device with the computing device.

The method may further comprise the peripherals manager receiving messages from the application virtualized on the virtualization server and sending them, according to the association, to the peripheral device, and/or receiving messages from the peripheral device and sending them, according to the association, to the application virtualized on the virtualization server.

According to an embodiment the method further comprises the peripherals server establishing the association by matching a first identifier received from the virtualization server with a second identifier received from the second client application, the first identifier identifying the first client device and the second identifier identifying the second client.

The first and second identifiers may be matched if they are the same. Alternatively, the first and second identifiers may be matched if the first and second identifiers are within a predefined threshold of each other, or according to a selection received from the virtualized application.

The first identifier may comprise one or more of the name of the computing device, the IP address of the computing device, the location of the computer terminal, the airport and terminal at which the computing device is located, and a key generated by the first application and/or the application virtualized on the virtualization server when the application virtualized on the virtualization server is executed. The second identifier may comprise one or more of the name of the peripherals interface, the IP address of the peripherals interface, the location of the peripherals interface, the airport and terminal at which the peripherals interface is located, and a key generated by the second application and/or the peripherals manager when communication between the peripherals manager 175 and the second application is established.

In one embodiment, the computing device comprises the peripherals interface and the name of the peripherals interface is the name of the computing device.

The virtualization server may comprise the peripherals manager or the peripherals manager may be implemented on a server separate to the virtualization server.

The computing device may comprise the peripherals interface or the peripherals interface may be implemented on a further computing device, separate to the computing device.

According to an embodiment there is provided a method of virtualizing an application of an airport passenger control system, in a network outside of the airport, the network comprising a virtualization server and a peripherals manager. The method comprises receiving, at the virtualization server, a request from a first client application executed at the airport to establish a first communication channel for communicative connection between a virtualized application executed by the virtualization server and the first client application and, in response, establishing the first communication channel. The method further comprises receiving, at the peripherals manager, a request from a second client application executed at the airport to establish a second communication channel for communicative connection between the peripherals manager and the second client application and, in response, establish the second communication channel. The method further comprises storing an association between the first and second communications channels to associate a peripheral device in communicative connection with the second client application with the first client application.

According to an embodiment there is provided a virtualization server for an airport passenger control system, the airport passenger control system using peripheral devices located at the airport and in communicative connection with a peripherals interface at the airport, the peripherals interface being in communicative connection with a peripherals manager in a network outside of the airport through a peripherals communication channel. The server is configured to establish a virtualization communication channel after receiving a request to establish the virtualization communication channel from a client application executed by a client device at the airport, execute a virtualized application in communicative connection with the client application through the virtualization channel, and store an association between the virtualization and peripherals communication channels to associate a peripheral device in communicative connection with the peripherals interface with the client application.

The virtualization server may be further configured to send, according to the stored association between the virtualization and peripherals communication channels, messages received from client application to the peripherals manager and/or from the peripherals manager to the client application.

According to an embodiment there is provided a method of operating a virtualization server for an airport passenger control system, the airport passenger control system using peripheral devices located at the airport and in communicative connection with a peripherals interface at the airport, the peripherals interface in communicative connection with a peripherals manager in a network outside of the airport through a peripherals communication channel. The method comprises, at the virtualization server, establishing a virtualization communication channel after receiving a request to establish the virtualization communication channel from a client application executed by a client device at the airport, executing a virtualized application in communicative connection with the client application through the virtualization channel, and storing an association between the virtualization and peripherals communication channels to associate a peripheral device in communicative connection with the peripherals interface with the client application.

The method may further comprise sending, according to the stored association between the virtualization and peripherals communication channels, messages received from client application to the peripherals manager and/or from the peripherals manager to the client application.

According to an embodiment there is provided a peripherals manager for facilitating use of a peripheral device in an airport passenger control system in which an application of the passenger control system is virtualized through a virtualized application executed on a virtualization server in communicative connection with a first client application executed on a computing device at the airport, the virtualization application being in communicative connection with the first client application through a first communication channel. The peripherals manager is configured to establish a second communication channel after receiving a request to establish the second communication channel from a second client application executed by a peripherals interface at the airport, and store an association between the first and second communication channels to associate a peripheral device in communicative connection with the peripherals interface with the first client application.

The peripherals manager may be further configured to send, according to the stored association between the first and second communication channels, messages received from the application virtualized on the virtualization server to the peripheral device and/or from the peripheral device to the application virtualized on the virtualization server.

According to an embodiment there is provided a method of operating a peripherals manager for facilitating use of a peripheral device in an airport passenger control system in which an application of the passenger control system is virtualized through a virtualized application executed on a virtualization server in communicative connection with a first client application executed on a computing device at the airport, the virtualization application being in communicative connection with the first client application through a first communication channel. The method comprises establishing a second communication channel after receiving a request to establish the second communication channel from a second client application executed by a peripherals interface at the airport, and storing an association between the first and second communication channels to associate a peripheral device in communicative connection with the peripherals interface with the first client application.

The method may further comprise sending, according to the stored association between the first and second communication channels, messages received from the application virtualized on the virtualization server to the peripheral device and/or from the peripheral device to the application virtualized on the virtualization server.

According to an embodiment there is provided a method of operating a system at an airport, the system comprising a computing device and a peripherals interface in communicative connection with a peripheral device. The method comprises the computing device, upon initialization of a first client application on the computing device, sending a request for the establishment of a first communication channel to a virtualization server located in a network outside the airport, to allow communication with a virtualization application being executed on the virtualization server. The method further comprises the peripherals interface sending a request for the establishment of a second communication channel to a peripherals manager located in the network outside the airport, and the computing device sending a first identifier to the virtualization server and the peripherals interface sending a second identifier to the peripherals server to facilitate the association of the first and second communication channels.

According to an embodiment there is provided a computing device at an airport and for use in an airport passenger control system. The computing device is configured to, upon initialization of a client application on the computing device, send a request for the establishment of a first communication channel to a virtualization server located in a network outside the airport, to allow communication with a virtualization application being executed on the virtualization server. The computing device is further configured to communicate an identifier of the first communication channel to the virtualization server to facilitate the association of the first communications channel with a second communications channel connecting a peripherals interface located in a network inside of the airport with a peripherals manager in a network outside of the airport.

According to an embodiment there is provided a method of operating a computing device at an airport in an airport passenger control system. The method comprises, upon initialization of a client application on the computing device, sending a request for the establishment of a first communication channel to a virtualization server located in a network outside the airport, to allow communication with a virtualization application being executed on the virtualization server. The method further comprises communicating an identifier of the first communication channel to the virtualization server to facilitate the association of the first communications channel with a second communications channel connecting a peripherals interface located in a network inside of the airport with a peripherals manager in a network outside of the airport.

According to an embodiment there is provided a peripherals interface for use in an airport passenger control system in which an application of an airport passenger control system is virtualized on a virtualization server in a network outside the airport, the virtualization server being in communicative connection with a client application executed on a computing device at the airport via a first communications channel. The peripherals interface is configured to initiate establishing a second communications channel with a peripherals manager located in a network outside of the airport, communicate an identifier of the second communication channel to the peripherals server to facilitate the association of the second communications channel with the first communications channel, and send data received from peripherals manager to a peripheral device in communicative connection with the peripherals interface and/or send data received from the peripheral device to the peripherals manager.

According to an embodiment there is provided a method of operating a peripherals interface in an airport passenger control system in which an application of an airport passenger control system is virtualized on a virtualization server in a network outside the airport, the virtualization server being in communicative connection with a client application executed on a computing device at the airport via a first communications channel. The method comprises initiating establishing a second communications channel with a peripherals manager located in a network outside of the airport, communicating an identifier of the second communication channel to the peripherals server to facilitate the association of the second communications channel with the first communications channel, and sending data received from peripherals manager to a peripheral device in communicative connection with the peripherals interface and/or send data received from the peripheral device to the peripherals manager.

BRIEF DESCRIPTION OF THE DRAWINGS

Embodiments of the present invention will be understood and appreciated more fully from the following detailed description taken in conjunction with drawings.

DETAILED DESCRIPTION

Embodiments of the invention help to overcome difficulties related to local network devices accessing globally available services.

End user devices, such as terminals and peripheral devices, including scanners and printers, are usually located on a local network environment in an airport. Data transmission between such devices and data sources outside of the local network is channeled through routers (gateways). Whilst these are free to contact data sources outside of the local network on behalf of the connected end user devices and without being inhibited by a firewall protecting the local network from unauthorized access, external data sources or systems cannot normally establish contact with components within the local network without interference or being blocked by the firewall. This is partly because native IP addresses in the local area network are hidden to external networks. It is consequently difficult for a system external to the local network/outside of the firewall to target an end user device.

Commercial off the shelf virtualization solutions exist on the market and provide multiple forms of hardware emulation; however they are not designed for specialist devices such as those used in Airports. These devices will expect very low latency when using interfaces such as RS-232 or Parallel (LPT) (<100 ms), or there can be significant bandwidth utilisation caused by the hardware level protocols such as with USB interfaces; therefore software has to reside on the client to facilitate rapid communication. With virtualization, the end user applications are executed on a server external to the client. The end user application (running on the server) has to believe that it is connecting to local devices as if it was installed on the client itself. For this to happen, the virtualization framework is enhanced with a device server designed to emulate local devices normally found by an end user application running on a local PC. This device server will also receive connection requests initiated directly from an application executing on the client workstation thus opening a communication channel to be used indirectly by the server application. As the communication channel is initiated on the client side, the router is able to route communications from the device server to the device, and the firewall allows this communication channel.

Figure 1:
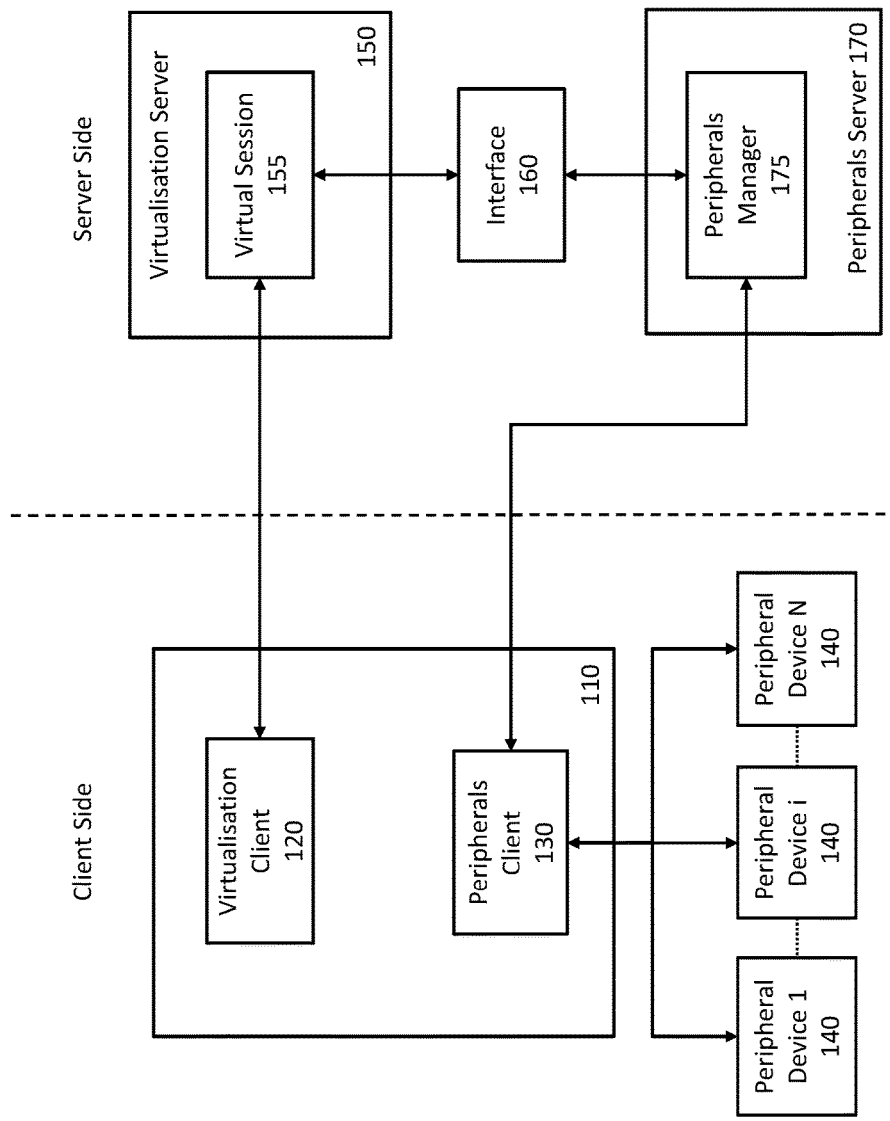
FIG. 1 shows a network according to an embodiment of the invention.

FIG. 1 shows a network according to an embodiment of the invention. The dashed line separates the client side located within the airport and a server side. Data traffic across this interface between the two sides is controlled by a firewall (not illustrated) in a known manner. Arrows indicate paths of communication between components of the network.

The client side comprises a client workstation 110 and associated peripheral devices 140. The server side comprises a virtualization server 150 for hosting virtualized applications for the client workstation 110, a peripherals server 170 for facilitating communication between the applications hosted on the virtualization server 150 and peripheral devices 140 located on the client side of the network, and an interface 160 for facilitating communication between the virtualization server 150 and the peripherals server 170.

The server side of the network can comprise one or more physical servers. The virtualization server 150 may, for example, be a different physical device to the peripherals server 170. Both servers may be co-located in a particular location or located in different locations, possibly even large physical distances apart. Some of these servers, such as the Peripherals Server 170, could be located close to the workstations 110, such as within the airport in which the workstations 110 are deployed. This said, in one embodiment the virtualization server 150 and the peripherals server 170 can also be servers that run on the same physical device. For reasons of redundancy this is, however, not preferred. In an embodiment both the virtualization server 150 and the peripherals server 170 serve multiple airports at the same time. A number of components such as gateways and other infrastructure elements are not shown in FIG. 1 for clarity.

The client workstation 110 is a device which runs and provides a user interface for a virtualization client 120 on the client side of the network. The client workstation 110 may take any form of computing device and may, for example, be a thin or zero client, a standard computer terminal or any other form of computing device able to implement an appropriate user interface and able to communicate with servers.

The virtualization client 120 is an application which provides the client side of the virtualization solution. This may be Microsoft™ Remote Desktop, Citrix Desktop Receiver™ or VMware™ Workstation.

The client workstation 110 also runs the peripherals client 130 which manages, on the client side, the communication between a number, N, of peripheral devices 140 and the peripherals server 170. The peripheral devices 140 may comprise common peripheral devices such as scanners, printers, cameras etc. Alternatively, or in addition, the peripheral devices 140 may also comprise non-standard peripheral devices such as those found in airports (boarding pass printers, bag tag printers, document printers, magnetic swipe readers, optical character recognition readers, gate readers, optical character recognition readers, etc.). The peripheral devices 140 may be directly connected to the client workstation 110 (e.g. via a USB connection) or may be connected to the client workstation 110 over a local area network such as a wireless network.

The virtualization server 150 hosts the virtualized applications for interaction with the virtualization clients 120. The virtualization server 150 may be a single server or may be a farm of similar servers for scalability and resilience purposes. For each user accessing the virtualization server 150 via a respective virtualization client 120 a corresponding virtualization session 155 is established. This virtualization session 155 runs the virtualized application which is hosted on the virtualization server 150. The virtualization session 155 may comprise a virtual instance of an operating system or may be a container for virtualizing an application. The virtualization session 155 runs the application being virtualized and communicates with the virtualization client 120 to provide application outputs and receive user inputs.

The peripheral device server 170 is a device which manages, on the server side, the communication between peripheral devices 140 and the virtual session 155. As with the virtualization server 150, the peripherals server 170 may be a single server or may be a farm of similar servers. The peripheral device server 170 runs a peripherals manager 175 which utilizes contextual information to ensure that the application being executed on the server 150 is communicating with the corresponding peripheral devices 140 connected to the client workstation 110.

As shall be described below, the peripherals manager 175 utilizes peripherals and virtualization identification information to establish a link between the peripheral devices 140 associated with the virtualization client 120 and the corresponding virtual session 155. The peripherals ID identifies the peripherals client 130 whilst the virtualization ID identifies the virtualization client 120. The identification information may be one or a combination of any of the following: workstation name, workstation IP address (e.g. IPv4 or IPv6), a unique key, any other unique token generated and shared for associating the virtualized application with a peripherals client 130. It will be appreciated that the purpose of the peripherals ID and the virtualization ID is to enable unambiguous communication between the peripheral devices 140 and the virtual session 155 and/or the virtualization client 120 via the server side. For this purpose it is not important if the identification information is issued from the client side, say by the virtualization client 120 or peripherals client 130 or by the sever side, say by the virtualization server 150 or the peripherals server 170.

The interface 160 facilitates communication between the application running on the virtualization server 150 and a peripherals manager 175 running on the peripherals server 170, so that any operation of the peripheral devices 140 that may be required by the virtualization session 155 running on virtualization server 150 on behalf of the virtualization client 120 can be implemented by means of an interaction between the peripherals sever 170 and the peripherals client 130.

The interface 160 may emulate a standard physical interface, such as a serial COM port, a USB, a parallel port. Alternatively an API may be provided (in a common use terminal equipment (CUTE) mode) such as the common use passenger processing system (CUPPS) standard (RECOMMENDED PRACTICE 1797, part of Passenger Services Conference Resolutions Manual (aka PSC)) defined by the International Air Transport Association (IATA). The interface 160 may form part of the virtualization server 150, the peripherals server 170 or may be external to both, being executed on a separate device. The interface 160 may be incorporated into the peripherals manager 175 or the virtual session 155.

Figure 2:
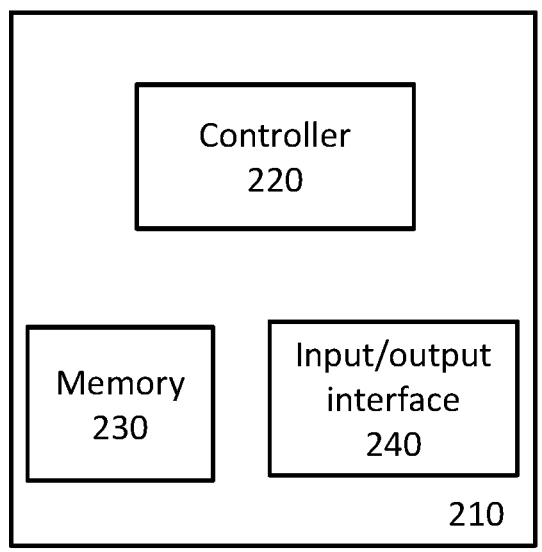
FIG. 2 shows a client workstation for implementing the client side processes according to an embodiment of the invention.

FIG. 2 shows a client workstation 210 for implementing the client side processes according to an embodiment of the invention. The client workstation 210 comprises a controller 220, memory 230 coupled with the controller 220, and an input/output interface 240. The controller 220 is in communicative connection with the memory 230 and the input/output interface 240. The memory 230 stores computer executable program code that, when executed by the controller 220 is configured to implement the functions of the client workstation 210 as discussed herein. In particular, the code stored in the memory 230 is configured to, when executed by the controller 220, run a virtualization client for communication with an external virtualization sever 150 and a peripherals client 130 for communicating with an external peripherals server 170. Input/output interface 240 is configured to allow the controller 220 to communicate with the peripheral devices 140 in communicative connection with the client workstation and to communicate with the virtualization 150 and peripherals 170 servers, for instance, via a router.

Figure 3:
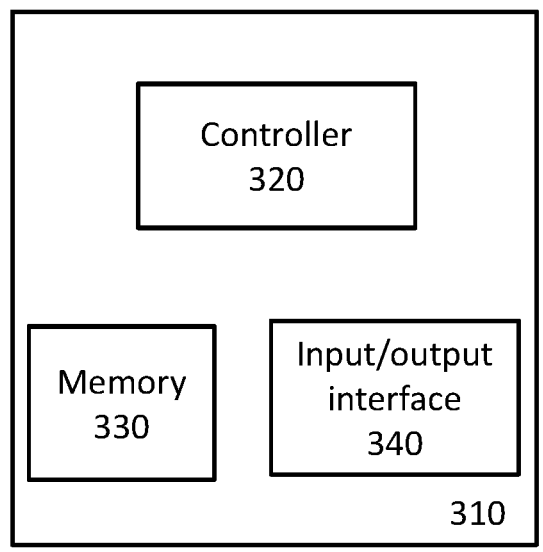
FIG. 3 shows a virtualization server.

FIG. 3 shows a virtualization server 310. The virtualization server 310 comprises a controller 320, memory 330 coupled with the controller 320, and an input/output interface 340. The controller 320 is communicatively connected to the memory 330 and the input/output interface 340. The memory 330 stores computer executable program code that, when executed by the controller 320 is configured to implement the functions of the virtualization server 310 as discussed herein. In particular, the controller 320 is configured to run one or more virtual sessions, each virtualizing an application for a corresponding virtualization client. Input/output interface 340 is configured to allow the controller 320 to communicate with a virtualization client 120 on a client workstation 110/210 and with a peripherals manager 175 on a peripherals server 170 via interface 160.

The peripherals server may be a server much like that shown in FIG. 3. In this case, instead of the memory 330 storing computer executable program code that, when executed by the controller 320, runs virtualization sessions, the computer executable program code is configured to run the peripherals manager. Moreover, the input/output interface 340 is configured to communicate with a peripherals client 130 and with a virtual session on a virtualization server via an interface.

Each of the controllers 220, 320 may include one or more processors including at least one hardware-based microprocessor. Each of the memories 230, 330 may represent the random access memory (RAM) devices comprising the main storage, as well as any supplemental levels of memory, e.g., cache memories, non-volatile or backup memories (e.g., programmable or flash memories), read-only memories, etc. In addition, the memories 230, 330 may be considered to include memory storage physically located elsewhere in the respective computer system, e.g., any cache memory in a microprocessor, as well as any storage capacity used as a virtual memory, e.g., as stored on a mass storage device or on another interconnected computer. Each of the controllers 220, 320 typically operates under the control of an operating system and executes or otherwise relies upon various computer software applications, components, programs, objects, modules, engines, data structures, etc. Each of the controllers 220, 320 may have access to a database used as a data store to collect and organize data required to implement the functions of client workstation 210, the virtualization server 310, the peripherals server, etc.

Figure 4:
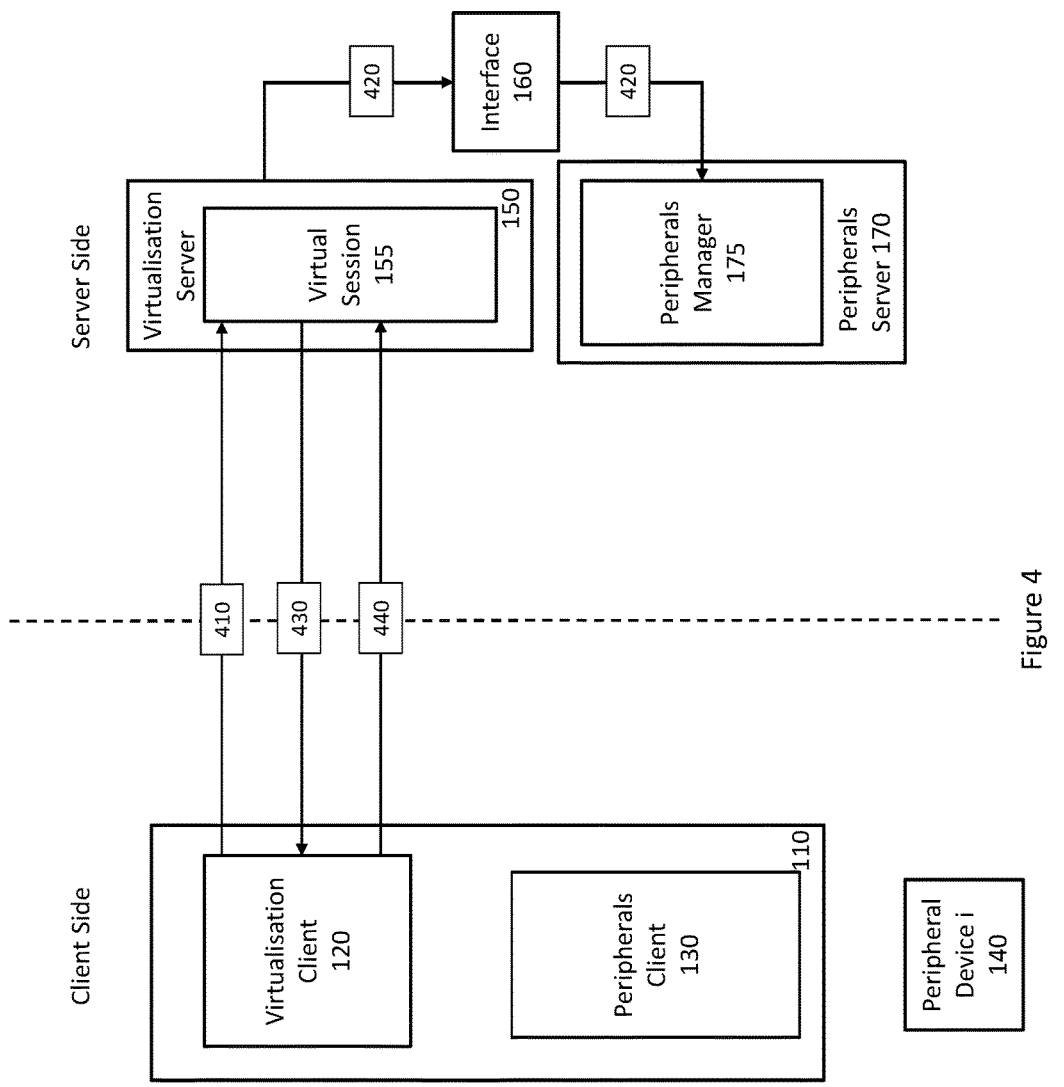
FIG. 4 shows the communication steps between the client workstation and the virtualization server when establishing a virtual session.

FIG. 4 shows the communication steps between a client workstation 110 and the virtualization server 150 when establishing a virtual session 155. The user/operator starts the virtual client 120 when he or she starts to use the workstation 110. Once the virtualization client 120 has been initiated it sends an instruction 410 to the virtualization server 150 to establish a virtual session 155. As the instruction 410 has originated from the virtualization client 120/workstation 110, the firewall separating the client side from the outside world and consequently also from the servers 150 and 170 will allow the instruction 410 to pass unimpeded. With the issue of the instruction 410 a communication channel is established between the virtualization client 120 running on workstation 110 and the virtualization session 155 running on virtualization server 150.

In the embodiment, the instruction includes information identifying the user. The virtualization server 150 determines a virtualization ID based on this information and sends 420 this virtualization ID to the peripherals manager 175 via interface 160 to allow the peripherals manager 175 to link the virtualization client 120 or the virtual session 155 to the peripherals client 130 or associated peripheral devices 140. The virtualization ID includes client identification information, such as, user identification (UID), workstation name (WN), workstation IP address (WIP), the name of the airport and terminal building from which the connection is being made (APT), a token (TOK) (such as a structured element) generated by the workstation 110, localisation information (e.g. from GPS, beacon or other), or any other information which could identify the virtualization client 120.

Once the virtualization session 155 has been established, the application running in the virtualization session 155 can perform its required functions and transmit output information 430 to the virtualization client 120. The virtualization client 120 provides a user interface allowing the user to interact remotely with the application running in the virtual session 155. Any inputs from the user, such as mouse movements or keyboard inputs, are communicated 440 to the virtualization session 155 by the virtualization client 120. Steps 430 and 440 are repeated throughout the virtual session to allow the user to remotely control the application.

Figure 5:
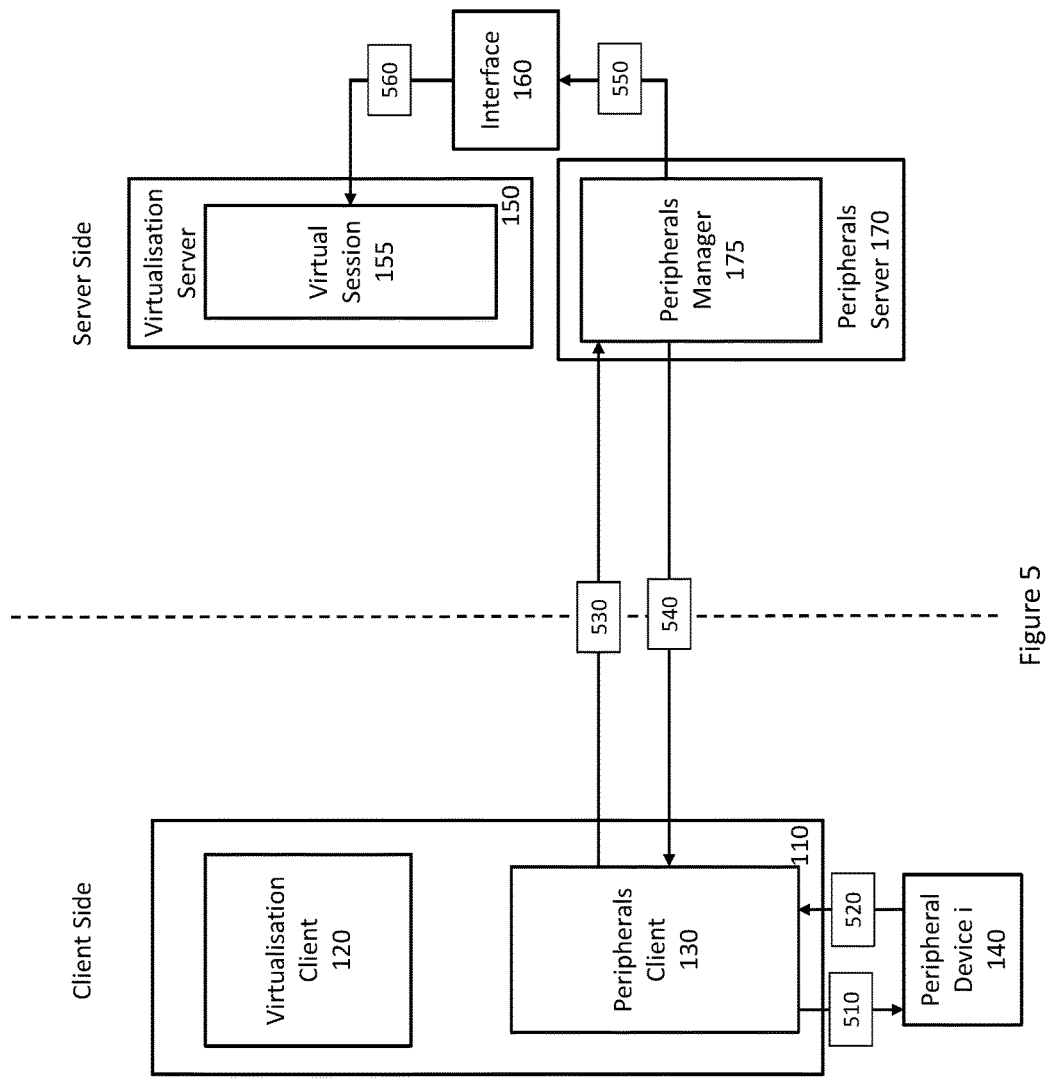
FIG. 5 shows the communication between the peripherals client and the peripherals manager when a virtual session is established.

Turning now to the operation of the peripherals client 130 and the peripherals manager 175, FIG. 5 shows the communication between the peripherals client 130 and the peripherals manager 175 when establishing a communication channel between the peripherals client 130 and the peripherals manager 175. In situations in which the workstation 110 is connected to the peripheral devices 140 through physical communications links that uniquely associate the peripheral devices 140 with the workstation 110 the peripherals client 130 initially sends a connection request 510 to any available peripheral devices 140. The available peripheral devices 140 respond 520 to allow the peripherals client 130 to determine the peripheral devices 140 to which it is connected. If a number of peripheral devices 140 are permanently connected to the workstation 110, then the workstation may of course already possess a list of these connected devices, so that there is no need for any such identification when the peripherals client 130 is initiated.

Once initialized the peripherals client 130 establishes a connection with the peripherals server 170, which in turns initiates the peripherals manager 175. The peripherals client 130 sends 530 to the peripherals manager 175 a connection request including information identifying the peripherals client 130. The information identifying the peripherals client 130 is a peripherals ID and may include identification information, such as, user identification (UID), workstation name (WN), workstation IP address (WIP), the name of the airport and terminal from which the connection is being made (APT), a token (TOK) (such as a structured element) generated by the workstation 110, localisation information (e.g. from GPS, beacon or other), or any other information which could identify the peripherals client 130.

With the issue of the connection request 530 a communication channel is established between the peripherals client 130 running on workstation 110 and the peripherals manager 175 running on peripherals server 170.

The peripherals manager 175 stores the peripherals ID received from the peripherals client 130 and determines whether a corresponding virtualization session 155 has been established, i.e. whether a matching virtualization ID has been received from the virtualization server 150. A virtualization ID is considered matching if it is the same as the peripherals ID or if it is known or deemed likely, based on the information available to the device on the server side, that the virtualization client 120 is running on a workstation 110 that is associated and/or in physical proximity with peripheral device(s) 140 that are connected to the peripherals client 130 that has issued/is identified by the peripherals ID. If a corresponding virtualization session 150 is running, then the peripherals manager 175 associates the peripherals communication channel with the virtualization communication channel. This association can, for example, be achieved via a mapping table associating the peripherals ID with the virtualization ID. Directional mapping tables of each data element may be used. If no corresponding virtualization ID has been received, then the peripherals manager 175 stores the peripherals ID received from the peripherals manager 130 and waits for a matching virtualization ID to be received from the virtualization server 155. It will be appreciated that a mapping table may not be required if peripherals ID and virtualization ID match. However, even in situations of this nature the use of mapping table may be advantageous, given that it allows associating virtualization and peripheral IDs if doing so automatically is not possible or fails.

The mapping table may store known associations between virtualization clients 120 operating on a particular workstation 110 or the particular workstation 110 itself with the surroundings of the workstation 110. For example, the mapping table may store information for one or more workstations 110 identifying peripheral devices 140 in the vicinity of the workstation 110 or that had previously been used for connecting to a virtualization client 120 running on the workstation 110. In this fashion an association between a virtualization ID and a peripherals ID can be created using the mapping table in situations in which the two IDs are not automatically deemed to be matching. Alternatively or additionally the virtualization server 150 may be configured to cause the virtual session 155 associated with a particular virtualization ID to display a user interface to the user as part of the virtualization client 120, prompting the user to select a peripheral device 140 for use with the current virtualization client 120. Ways of providing such a selection to a user are known in the art and will for this reason not be described in any more detail herein.

The peripherals manager 175 matches the peripherals and virtualization IDs based on a set of rules. The rules may state that one or more of the parameters in the IDs must be the same for a match to be determined. In one embodiment, the peripherals and virtualization IDs comprise a workstation name and a match is determined if the workstation names are the same. In an alternative embodiment, the IDs comprise the IP address of the workstation 110 and the terminal and airport at which the workstation 110 is located and a match is determined if the IP addresses and the terminal and airports are the same.

In a further embodiment, a match may be determined if the IDs contain similar parameters. For instance, where the IDs comprise localisation information, a tolerance may be defined such that a match is determined if the localisation information indicates positions within a given distance from each other. This allows a virtualization client 120 to be connected to nearby peripheral devices 140.

In an alternative embodiment, a match may be determined based on a user or application selection. The peripherals manager 175 provides a list of available peripherals clients 130 to the virtualized application. The virtualized application, either autonomously or in response to input from the user via the virtualization client 120, then issues a selection of one of the peripherals clients 130. Based on this selection, the peripherals manager 175 matches the virtualization ID of the virtualized application to the peripherals ID of the selected peripherals client.

A list of the peripheral devices 140 to which it is connected may also be sent. The peripherals manager 175 then uses this information to store a record of the peripheral devices which are available to the virtualization client 120. Optionally, the peripherals manager 175 then sends to the peripherals client 130 a confirmation 540 that the available peripheral devices 140 have been successfully registered. The peripherals manager 175 also sends 550 a list of available devices and the unique ID to the interface 160. The interface 160 directs the list of available devices 560 to the appropriate virtual session based on the association between the virtualization and peripherals IDs. This informs the virtualized application of the peripheral devices 140 which are available to it. The virtualization session 155 may further send the list of available devices to the virtualization client 120 in the form of an output to report to the user.

In an alternative embodiment, no list of available devices is sent to the virtualization application. Instead, the virtualization application is preconfigured with a list of one or more expected peripheral devices 140. This embodiment is based on the assumption that each client workstation 110 has a given set of working peripheral devices 140 associated with it. This offers a simpler implementation; however, the list of expected peripheral devices 140 may not always be accurate.

Figure 6:
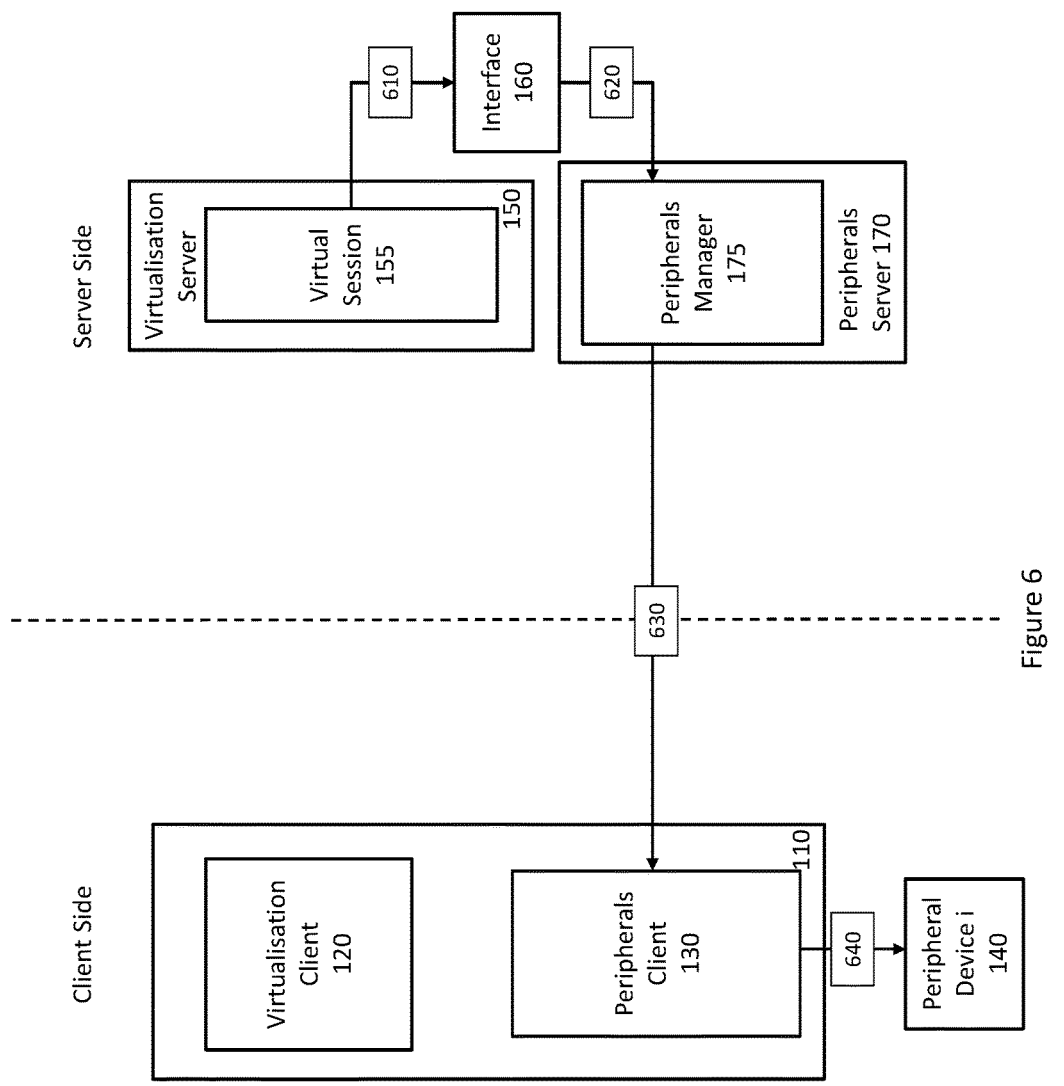
FIG. 6 shows the communication between the components in the network when an application instructs a peripheral device to perform an action.

FIG. 6 illustrates the communication between the components in the network when a virtualization session 155 instructs a peripheral device 140 to perform an action. The virtual session 155 sends an instruction 610 to the interface 160. The instruction 610 may be initiated by the application, or may be initiated by the user instructing the application, via the virtualization client 120, to utilize the peripheral device 140. The instruction may be, for instance, an instruction to print a document. The interface sends the instruction 620 to the peripherals manager 175. The instruction may contain the virtualization ID for the virtualized application. The peripherals manager 175 determines the peripherals client 130 associated with the virtualization ID and sends the instruction 630 to the peripherals client 130 via the communication channel established between the peripherals manager 175 and the peripherals client 130. The peripherals client 130 then forwards the instruction 640 to the peripheral device 140. Optionally, once the action has been completed as instructed, the peripheral device 140 sends a confirmation back to the virtualization session 155 via the reverse of the communication path taken by the instruction.

Figure 7:
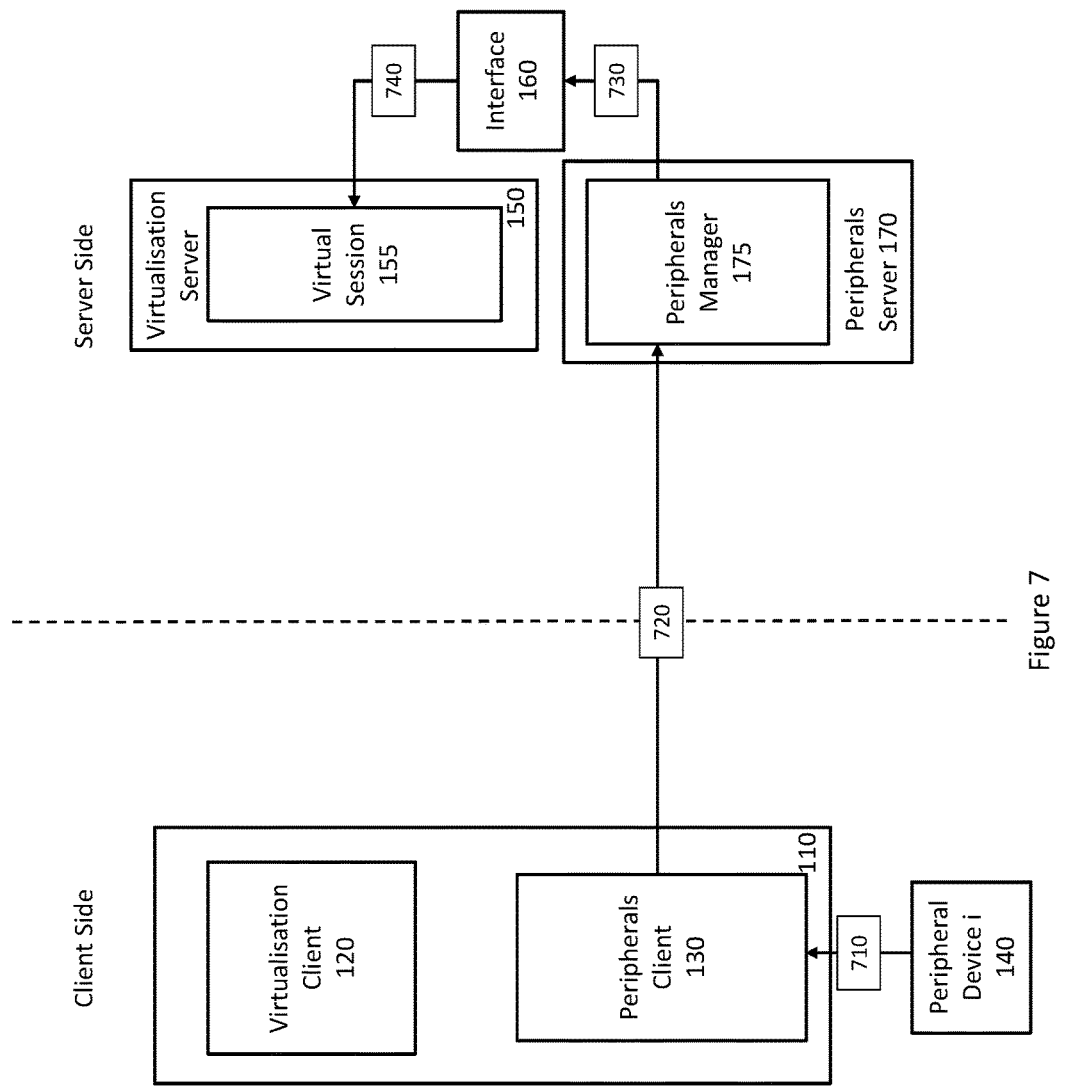
FIG. 7 shows the communication between the components in the network when a peripheral device communicates with a virtual session.

FIG. 7 shows the communication between the components in the network when a peripheral device 140 communicates with a virtual session 155. The peripheral device 140 sends data 710 to the peripherals client 130. This data may be, for instance, a scanned image or a reading from a bar code scanner. The peripherals client 130 sends the data 720 to the peripherals manager 175 via the communication previously established between the peripherals client 130 and the peripherals manager 175. The peripherals manager 175 knows which virtual session 155 to send the data to due to the stored association between the peripherals client 130 and the virtual session 155. The peripherals manager 175 forwards the data 730 to the interface 160 which in turn sends the data 740 to the virtual session 155. The interface 160 may convert the data for appropriate use with the virtualized application before sending the converted data on. The virtualized application can then process the data as required, for instance, check a passenger in when a boarding pass has been scanned. The virtualization session 155 may then send this data, or information derived from the data, to the virtualization client 120 so that it may be reported to the user and/or passed to the backend system to which the application is connected (if connected).

Embodiments of the invention establish a communication channel between a peripherals client 130 and a peripherals manager 175 to facilitate the communication between peripheral devices 140 and applications running on a virtualization server 150. As the communication channel is established by the peripherals client 130 running on a client workstation 110, no communications are blocked by any client side firewalls and the router is aware of the client workstation 110 so that it may forward communications from the virtualization server. This ensures effective communication across a variety of networks with both public and private addressing schemes.

Moreover, establishing independent communication channels for the communication streams between the virtualization client 120/virtualization session 155 and between the peripherals client 130 and the peripherals manager 175 respectively the embodiments can be implemented with existing standard virtualization schemes and do not need to apply, as is the case in known other methods of virtualizing applications in airport terminals, modifications to virtualization schemes to enable the use of virtual channels.

By insulating the peripheral device communication channel from the virtualization technology this enables the use of multiple technologies at the same workstation 110. These may offer differing virtualization solutions but also other forms of front-end deliveries such as HTML and an easier adoption of future evolutions. It also enables the sharing of peripheral devices 140 across multiple types of client devices, such as tablets, mobile phones, phablets, workstations on cruise ships, peripherals on-board aircraft etc. regardless of the operating system they use and independent of the user interface technology used (virtualized or not). Accordingly, whilst embodiments described herein discuss virtualizing an application via a client workstation 110, this workstation 110 may be any form of computing device, such as tablets, mobile phones, etc. as discussed above.

Various modifications and alternatives to the above embodiments are envisaged. In the embodiment of FIG. 2, the client workstation 210 is a normal computer terminal which runs the virtualization client and the peripherals client based on computer code stored in memory 230. In further embodiments, the client workstation 210 is a thin client or a zero client with no hard drive. Where the client workstation 210 is a zero client, it comprises a controller specifically configured to run the virtualization and peripherals clients.

Whilst the embodiment of FIG. 1 shows the virtualization server 150 and the peripherals server 170 as separate servers, in an alternative embodiment, the virtual session 150 and the peripherals manager 175 are operated on the same server or set of servers. Accordingly, the two channels required to communicate with the virtualization client 120 and the peripherals client 130 may be established using the same device Furthermore, whilst in the embodiments of FIGS. 1 and 2 the virtualization client 120 and peripherals client 130 are implemented on the same device, the client workstation 110, in an alternative embodiment, the peripherals client 130 is implemented on a separate device to the client workstation 110.

It will, moreover, be appreciated that, whilst in one embodiment all peripheral devices 140 that are either physically connected or are connectable, via a data connection, to a workstation 110 can be managed by the peripherals client 130 (and mapped to a virtual session 155 for control by the user via the virtualization client 120), in another embodiment fewer than all of the peripheral devices 140 or even just one particular peripheral device 140, for example a bag tag or boarding pass printer or a scanner, may be associated with the virtualization client 120 in this manner.

It is moreover envisaged that the above mentioned mapping table not only stores information that associates a virtualization client 120 running on a particular workstation 110 with peripheral devices 140 connected or connectable to a specific peripherals client 130 but also information that associates the virtualization client 120 with a further or several further peripherals clients 130 for use, should during operation the peripherals client 130, or one or more devices operating in conjunction with it, fail. The additional peripherals client(s) 130 and device(s) 140 mapped to the virtualization client 120 in this fashion can then be used to take the place of the defective peripherals client 130/peripheral device 140.

In one embodiment, a secondary peripherals client, in addition to the peripherals client 130, is associated with the virtualized application. The secondary peripherals client provides a back-up in the event that the peripherals client 130 fails. If connection is lost to the peripherals client 130 or if the peripherals client 130 stops working, the peripherals manager 175 automatically switches to the secondary peripherals client to provide access to alternative peripheral devices. The secondary peripherals client 130 may be located on the same workstation 110 as the peripherals client 130, or may be located on a different workstation. In a further embodiment, the secondary peripheral device may be connected to alternative peripheral devices and the connection may be swapped to the secondary peripherals client in the event that one of the peripheral devices 140 fails.

Whilst the above embodiments discuss the peripherals manager 175 providing and storing the association between the peripherals communication channel and the virtualization communication channel, the virtualization server 150 may instead implement this functionality, with the peripherals manager merely providing the communication link to the peripherals client 130.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions which are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for managing an airport passenger processing system, the system comprising:
    a virtualization server that comprises at least one first processor and at least one first non-transitory memory storing first computer-executable code that, when executed by the at least one first processor, causes the virtualization server to perform first operations comprising:
        communicating with a first client application of a computing device separated from a network of the virtualization server by a firewall using a first communication channel established by the first client application;
    a peripherals server communicatively coupled to the virtualization server, the peripherals server comprising at least one second processor and at least one second non-transitory memory storing second computer-executable code that, when executed by the at least one second processor, causes the peripherals server to perform second operations comprising:
        communicating with a second client application of a peripherals interface separated from a network of the peripherals server by the firewall using a second communication channel established by the second client application, the peripherals interface coupled with a peripheral device;
        wherein communicating with the second client application comprises routing messages between the virtualization server and the second client application according to a stored association between the first communication channel and the second communication channel.

2. The system of claim 1 wherein routing messages between the virtualization server and the second client application comprises receiving virtualized application messages for the peripheral device from a virtualized application on the virtualization server and sending the virtualized application messages, according to the association, to the peripherals interface.

3. The system of claim 1 wherein the second operations further comprise receiving peripheral device messages from the peripherals interface and sending the peripheral device messages, according to the association, to a virtualized application on the virtualization server.

4. The system of claim 1 wherein the second operations further comprise receiving from the virtualization server, a first identifier identifying a first client device and establishing the stored association by matching the first identifier and a second identifier identifying a second client device.

5. The system of claim 4 wherein the first identifier and the second identifier are matched if identical.

6. The system of claim 4 wherein the second operations further comprise matching the first identifier and the second identifier if the first identifier and the second identifier are within a predefined threshold of each other.

7. The system of claim 4 wherein the second operations further comprise matching the first identifier and the second identifier according to a selection received from a virtualized application.

8. The system of claim 4 wherein the first identifier comprises one or more of a name of the computing device, an IP address of the computing device, a location of the computing device, an identifier of an airport and terminal at which the computing device is located, and a first key generated by the first client application and/or the virtualized application and the second identifier comprises one or more of a name of the peripherals interface, an IP address of the peripherals interface, a location of the peripherals interface, an identifier of an airport and terminal at which the peripherals interface is located, and a second key generated by the second client application and/or the peripherals server.

9. The system of claim 1 wherein the peripherals server is implemented on a server separate from the virtualization server.

10. The system of claim 1 wherein the computing device comprises the peripherals interface.

11. A system comprising:
a computing device that comprises at least one first processor and at least one first non-transitory memory storing first computer-executable code that, when executed by the at least one first processor, causes the computing device to perform first operations comprising:
sending a first request to establish a first communication channel to a virtualization server, the first communication channel allowing communication with a virtualized application of the virtualization server; and
sending a first identifier to the virtualization server; and
a peripherals interface communicatively coupled with a peripheral device, the peripherals interface comprising at least one second processor and at least one second non-transitory memory storing second computer-executable code that, when executed by the at least one second processor, causes the peripherals interface to perform second operations comprising:
sending a second request to establish a second communication channel to a peripherals server communicatively coupled with the virtualization server; and
sending a second identifier to the peripherals server; and
wherein the first identifier and the second identifier enable the peripherals server and the virtualization server to route communication between the first client application and the peripheral device using the first communication channel and the second communication channel.

12. The system of claim 11 wherein the second operations further comprise sending first data received from the peripherals server to the peripheral device, or sending second data received from the peripheral device to the peripherals server.

13. The system of claim 11 wherein the first identifier comprises one or more of a name of the computing device, an IP address of the computing device, a location of the computing device, an identifier of an airport and terminal at which the computing device is located, and a first key generated by the first client application and/or a virtualized application and the second identifier comprises one or more of a name of the peripherals interface, an IP address of the peripherals interface, a location of the peripherals interface, an identifier of an airport and terminal at which the peripherals interface is located, and a second key generated by the peripherals interface and/or the peripherals server.

14. A system for virtualizing an application of an airport passenger control system, comprising:
a virtualization server that comprises at least one first processor and at least one first non-transitory memory storing first computer-executable code that, when executed by the at least one first processor, causes the virtualization server to perform first operations comprising:
establishing a first communication channel between a first client application executed at an airport and a virtualized application executed by the virtualization server in response to a request received from the first client application; and
receiving a first identifier from the first client application; and
a peripherals server communicatively coupled to the virtualization server, the peripherals server comprising at least one second processor and at least one second non-transitory memory storing second computer-executable code that, when executed by the at least one second processor, causes the peripherals server to perform second operations comprising:
establishing a second communication channel between a peripherals interface executed at an airport and a peripherals manager executed by the peripherals server in response to a request received from the peripherals interface; and
receiving a second identifier from the peripherals interface; and
wherein the first identifier and the second identifier enable the peripherals server and the virtualization server to route communication between the first client application and the peripheral device using the first communication channel and the second communication channel.

15. The system of claim 14 wherein the second operations further comprise receiving messages from the virtualized application on the virtualization server and sending the messages, according to an association between the first identifier and the second identifier, to the peripheral device.

16. The system of claim 14 wherein the second operations further comprise receiving messages from the peripheral device and sending the messages, according to an association between the first identifier and the second identifier, to the virtualized application on the virtualization server.

17. The system of claim 14 wherein the second operations further comprise receiving the first identifier from the virtualization server and associating the first communication channel and the second communication channel by matching the first identifier and the second identifier.

18. The system of claim 17 wherein the first identifier and the second identifier are matched if identical.

19. The system of claim 17 wherein the second operations further comprise matching the first identifier and the second identifier if the first identifier and the second identifier are within a predefined threshold of each other.

20. The system of claim 17 wherein the second operations further comprise matching the first identifier and the second identifier according to a selection received from the virtualized application.

21. The system of claim 17 wherein the first identifier comprises one or more of a name of a computing device that executes the first client application, an IP address of the computing device, a location of the computing device, an identifier of an airport and terminal at which the computing device is located, and a first key generated by the first client application and/or the virtualized application and the second identifier comprises one or more of a name of the peripherals interface, an IP address of the peripherals interface, a location of the peripherals interface, an identifier of an airport and terminal at which the peripherals interface is located, and a second key generated by the peripherals interface and/or the peripherals manager.

22. The system of claim 14 wherein the virtualization server comprises the peripherals server.

23. The system of claim 14 wherein the peripherals interface and the first client application are executed on separate computing devices.

* * * * *